United States Patent [19]
Link et al.

[11] Patent Number: 5,825,573
[45] Date of Patent: Oct. 20, 1998

[54] CORRECTION OF THE TAPE-COUNTING DEVICES OF A RECORDER

[75] Inventors: Hermann Link, Donaueschingen; Axel Marzluf, Villingen-Schwenningen; Philippe Mace, Kappel, all of Germany

[73] Assignee: Deutsche Thomson-Brandt GmbH, Villingen-Schwenningen, Germany

[21] Appl. No.: 663,360

[22] Filed: Jun. 13, 1996

[30] Foreign Application Priority Data

Aug. 7, 1995 [DE] Germany .................. 195 28 955.2

[51] Int. Cl.⁶ .................................................. G11B 15/18
[52] U.S. Cl. ............................................. 360/72.2; 386/95
[58] Field of Search .................. 360/72.2, 72.1, 360/69, 71; 386/83, 95, 79

[56] References Cited

U.S. PATENT DOCUMENTS

| | | | |
|---|---|---|---|
| 5,140,435 | 8/1992 | Suzuki et al. | 360/72.2 |
| 5,488,409 | 1/1996 | Yuen et al. | 360/72.2 |
| 5,543,929 | 8/1996 | Mankovitz et al. | 360/72.2 |
| 5,546,191 | 8/1996 | Hibi et al. | 358/335 |

*Primary Examiner*—Tan Dinh
*Attorney, Agent, or Firm*—Joseph S. Tripoli; Frederick A. Wein; Francis A. Davenport

[57] ABSTRACT

Machine for recording and playing back information with a tape-storage medium comprising a tape-counting device for determining locations on the storage medium representing a beginning, an end or a section of a recorded information and labeling the locations as data. The labeled locations are stored in memory and marked. Selective winding to a chosen recording section which is associated with one of the marks occurs by means of the tape-counting device and the stored labeled data, together with another one of the marks which is detected and used as a reference, wherein, due to the detection of this reference mark, the tape-counting device is set to the data which was determined with the setting of the reference mark, and wherein the mark associated with the chosen recording section is dependent on the data of this reference mark. A tolerance window arranged symmetrically with respect to the reference mark is included to assist in the detection of the reference mark.

2 Claims, 3 Drawing Sheets

CORRECTION OF THE TAPE-COUNTING DEVICES OF A RECORDER

FIELD OF THE INVENTION

The invention relates to a machine which records and/or plays back information, in particular a video recorder, with a tape-counting device and an evaluation of markings recorded on the storage medium in tape form, for control purposes.

BACKGROUND OF THE INVENTION

It is known in the case of information recorded on video tapes to mark the beginning of a recording in order to be able to wind specifically to this beginning. Playback can consequently be started more quickly.

It is also known to set in addition to such a marking of the beginning further markings which can likewise be wound to specifically and with which certain scenes or sections within a recording can be identified and wound to more quickly. Such sectional markings permit a selective playback of chosen parts of a recording, for example if when playing back a recorded television program commercials are to be specifically skipped or if, for splicing together individual self-recorded scenes, only previously chosen parts of these scenes are to be automatically recorded over onto another machine.

For this purpose, the locations on the recording medium which are to be sectionally marked are determined by the tape-counting device of the machine and are respectively stored in a random-access memory of the machine as numerical values, which may correspond for example to tape running time data. With the aid of the stored numerical values and the tape-counting device, the tape locations to be marked can then be wound to automatically in a subsequent marking mode and can be marked on the tape, for example by modulation of the control track. The activation of the tape-counting device respectively takes place in this case by the frame synchronizing signal, recorded for example in the longitudinal track of the video tape and also referred to as the control pulse or CTL pulse.

However, poor tape-head contact or damage to the tape may have the effect that the respective tape counter readings of chosen parts of a recording no longer coincide with the previously determined and stored tape counter readings, for example after repeated winding forward and back. Consequently, the finding of tape locations of chosen parts of a recording to be marked or else already marked is made more difficult.

The object of the invention is therefore to improve the finding of chosen parts of a recording.

This object is achieved by the features specified in the independent claims. Advantageous refinements and developments are specified in the subclaims.

SUMMARY OF THE INVENTION

The invention is based on the idea of making a search or accelerated selective winding for the playback of chosen parts of a recording by means of a tape-counting device and corresponding stored tape counter reading values set out or start from a reference marking. If the recording concerned in this case is a recording according to the VHS-Index-Search System (VISS), the VISS marking identifying the beginning of the recording is preferably used as the reference marking.

For the detection of such a reference mark, a tolerance window, within which the occurrence of this reference mark is expected, is provided according to the invention. The position of the reference mark was stored before establishing the tape locations to be marked, likewise in the form of a tape counter reading. This tolerance window has the advantageous effect of allowing for the loss of a number of CTL pulses as well as counting errors of the tape-counting device of the machine.

Once the reference mark is detected, the further marked locations on the recording medium, for which corresponding tape counter reading values were stored in a prior marking operation, can be wound to precisely by means of the tape-counting device, i.e. with regard to the respective marked tape locations there is no longer any offset between the recording and the selective playback or a subsequent playback.

The invention also has the advantage that no additional circuitry is required. In principle, the software of today's recorders with a video-index-search and/or video-address-search system only has to be supplemented by the instruction to detect the reference marking and to make the drive control set out from this reference marking for the subsequent winding to marked tape locations by means of the tape-counting device and corresponding stored tape counter reading values.

BRIEF DESCRIPTION OF THE DRAWINGS

The invention is explained in more detail below with reference to the drawing, in which.

DETAILED DESCRIPTION OF THE DRAWINGS

Figure 1:
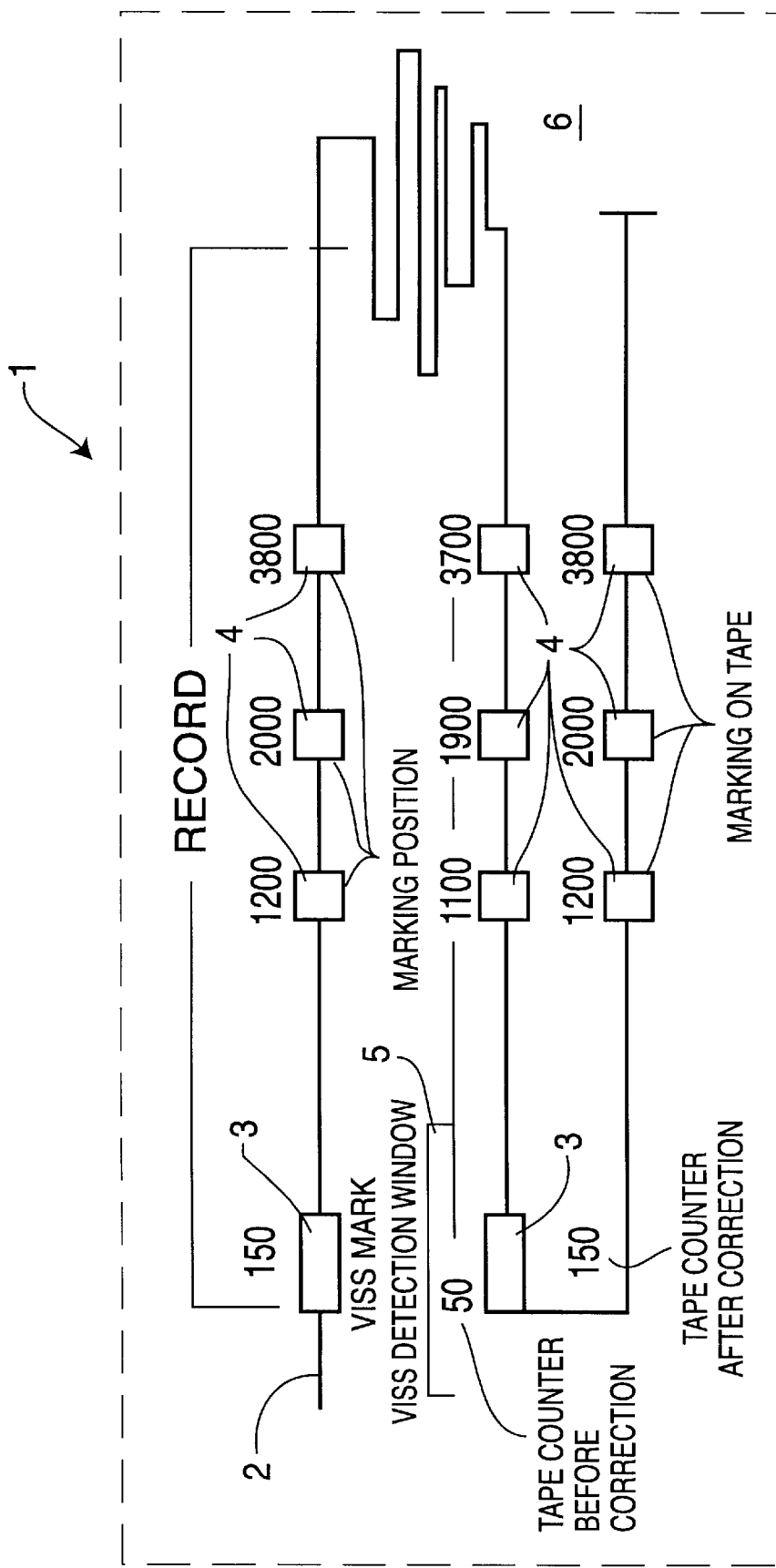
FIG. 1 shows a video recorder according to the invention with a recording medium in tape form and markings for the recording medium.

FIG. 1 symbolically shows a VHS video recorder 1 with a recording medium in tape form, referred to in the following as tape 2, mounted in a cassette. The tape 2 has in addition to a VISS mark 3, marking the beginning of a recording, further provisional markings 4, the respective positions of which are likewise stored during recording in a random-access memory, for example in the form of tape counter reading values, and mark certain sections, for example not of interest, such as commercial breaks during the recording mode of the recorder 1.

The markings 3 and 4 are consequently respectively assigned corresponding counter readings (here numbers 150 and also 1200, 2000 and 3800) of the tape-counting device (not shown) of the recorder 1. These counter readings, which are preferably based in each case on the counting of CTL pulses, are determined during the recording mode and are stored, for example in a RAM of the recorder 1. The determining and storing of the respective counter readings, including the marking of, for example, recording sections not of interest, by such markings 4 may also be performed manually, for example by means of an input key function provided in the recorder 1, during subsequent playback of the recording.

Recording sections not of interest can be specifically skipped, for example by the recorder 1 being switched over automatically into fast-forward mode or rewind mode by means of the stored counter readings and the control device for the tape or winding drive. Like the tape-counting device, the control device is similarly not shown; such devices of the recorder are sufficiently known, so they are discussed only to the extent applicable to the invention.

To be able to wind precisely to the tape locations 3, 4 even after further activations of the tape, in particular after winding operations with changing tape running direction, as symbolically represented by the tape region 6 convoluted in a meandering manner, according to the invention the tape 2 is initially wound to a counter reading which corresponds to the stored counter reading assigned to the VISS mark 3, the detection of the VISS mark 3, as the reference and/or starting marking, being a prerequisite for the actual precise winding to the other tape locations corresponding to the markings 4. On account of the possible loss of some CTL pulses and/or on account of counting errors of the tape-counting device, in particular owing to a changing tape running direction or damage to the tape, there is provided a tolerance window 5, within which the occurrence of the VISS mark 3 is expected and within which then, instead of the stored counter reading assigned to the VISS mark 3, the VISS mark 3 itself is the search criterion. The width and position of the window can be predetermined. Consequently, a certain number of CTL pulse losses and/or counting errors can be tolerated, or have no effect, in the detection of the VISS mark 3. A period of time which corresponds approximately to the picture content in the case of an approximately 4-minute normal playback has proved to be favourable as the width of the window 5. This window 5 is preferably arranged symmetrically with respect to the VISS mark 3, resulting in half the window width, or a window width corresponding to a 2-minute normal playback, on both sides of this mark 3 used as a reference and/or starting marking.

As soon as the VISS mark 3 is detected, the counter reading for the VISS mark 3 is reset or is set to the value which was determined with the setting of the VISS mark 3 and which corresponds for example to the beginning of the recording (in the present case to the number 150). Consequently, the old counter reading and new counter reading are also identical with regard to this tape position or tape location. From this counter reading (number 150) and by comparison of current counter readings with the stored counter readings, which are assigned to the tape positions for the recording sections identified by markings 4, the beginning and/or end of such recording sections can then be wound to precisely. As already mentioned, from this counter reading (number 150), it is also possible subsequently to perform such markings 4, for example in a similar way as in the case of a VISS mark 3 with a certain number of control (CTL) pulses, different in number from the VISS mark 3, for example, and with an altered mark/space ratio, if for example there are not as yet any corresponding markings for identifying certain sections or scenes in a recording or if for example other or further sections or scenes in this recording are to be marked.

The VISS mark 3 consequently forms a reference and/or starting marking for precisely winding to the further tape locations corresponding to the sectional markings 4, and, as long as recording sections are wound to and/or skipped in the sequence established by the recording, a single detection of the VISS mark 3 is adequate for all the sections as a reference marking.

Figure 2:
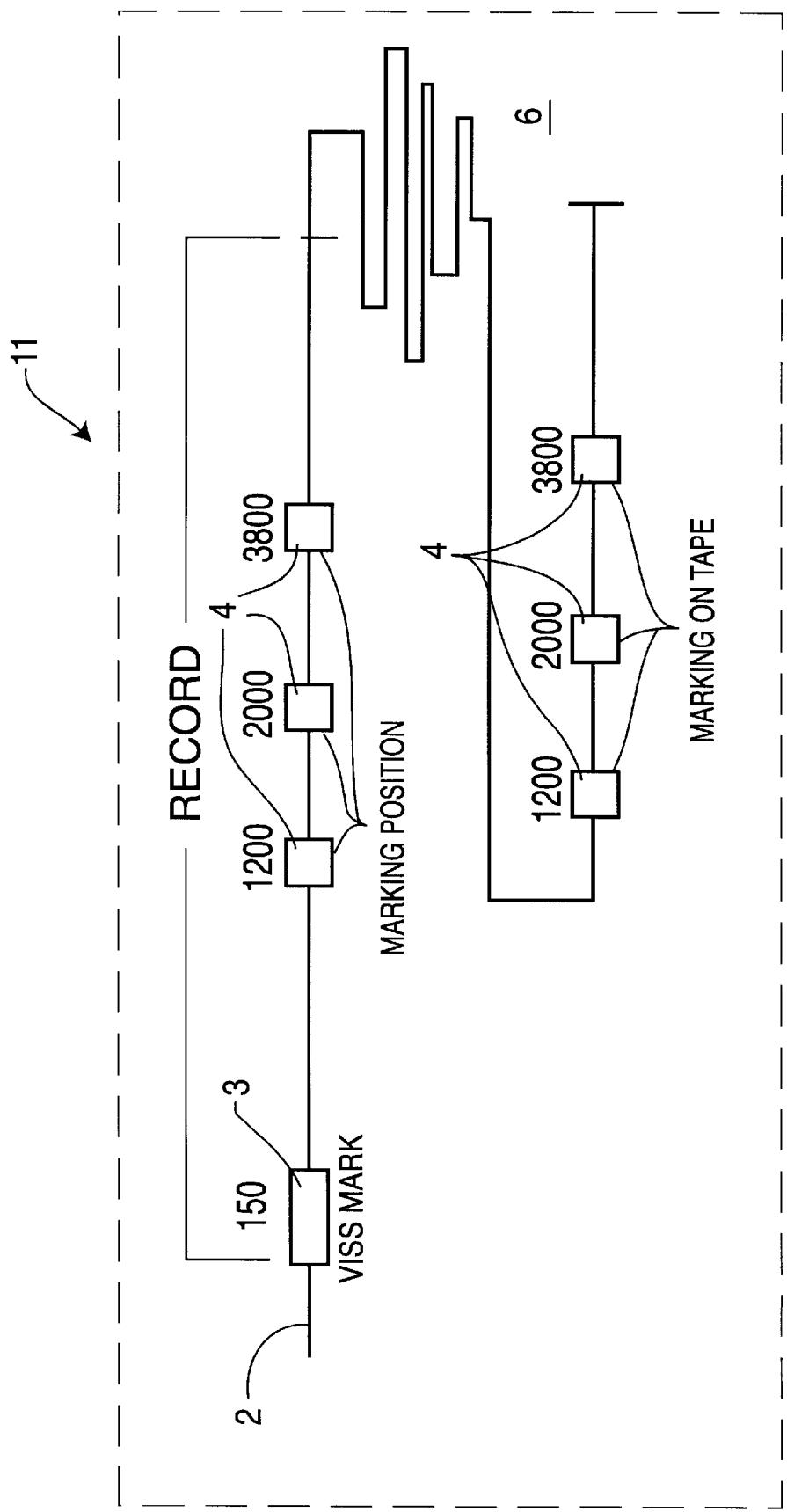
FIG. 2 shows a known video recorder with the recording medium in tape form and the markings according to FIG. 1.

Use according to the invention of the VISS mark 3 as a reference and/or starting marking achieves the effect that— in contrast to the known recorder 11 represented in FIG. 2—all the marked tape locations can always be wound to precisely. As symbolically represented in FIG. 2 by the offset of the same markings or the same tape counter values (numbers 1200, 2000 and 3800) drawn above one another, it must be expected in the case of the known recorder 11 that, after winding operations with changing tape running direction, as symbolically represented by the tape region 6 convoluted in a meandering manner, the tape locations provided with the markings 3 and 4 are not reached, although the respective indicated counter reading (numbers 1200, 2000 and 3800) corresponds to the respective stored value, which was determined during recording or subsequent selective playback. The actual beginning and/or actual end of marked recording sections must then be determined manually, by means of the search function of the recorder 11.

The corresponding control sequences for the process according to the invention and the tolerance window 5 are preferably realized by the software for the sequence control of the recorder drive. It goes without saying that the control sequences for the process according to the invention and the tolerance window 5 may, however, also be realized by hardware.

Figure 3:
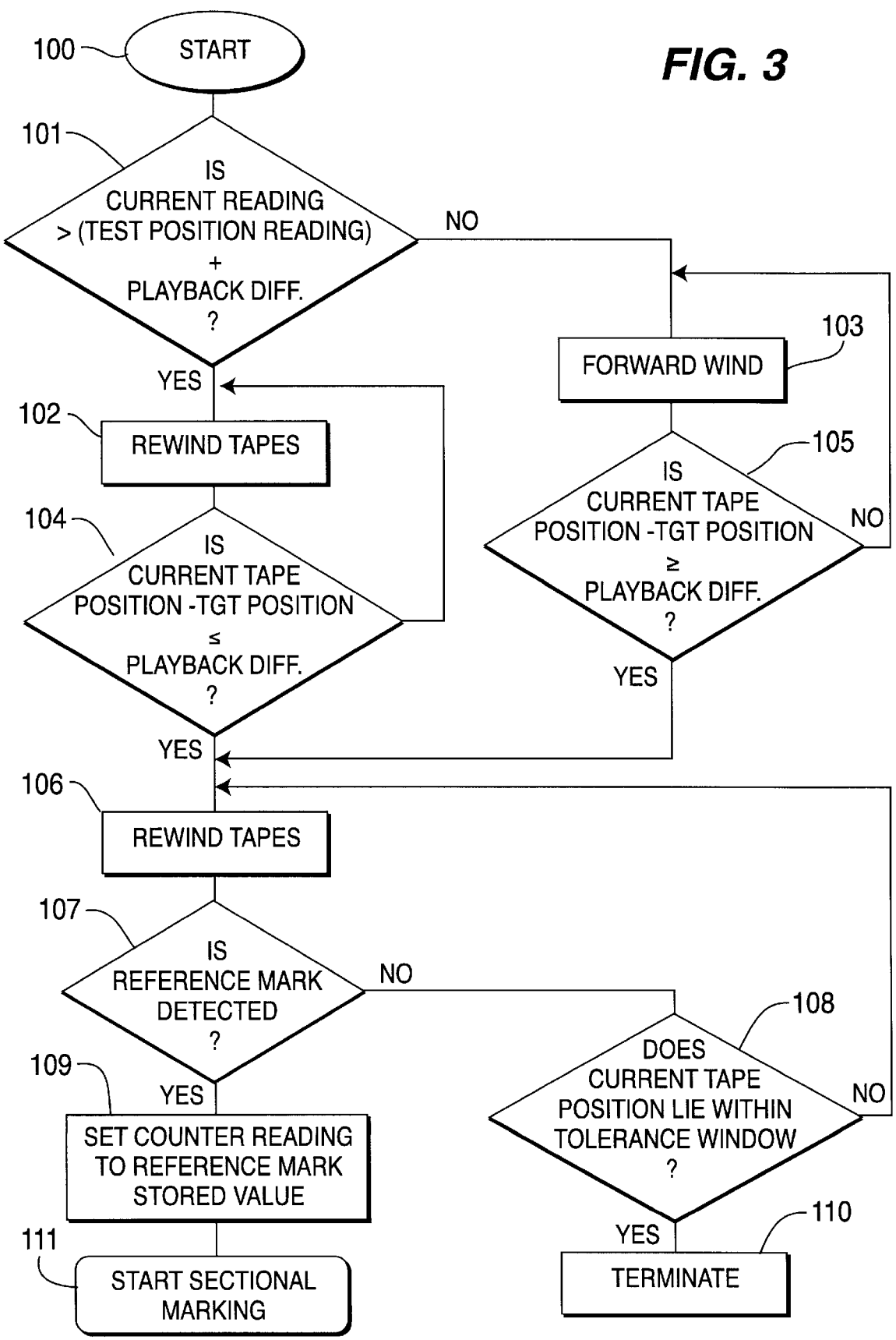
FIG. 3 shows a flow chart for explaining the function according to the invention of the video recorder as shown in FIG. 1.

In FIG. 3, the function according to the invention of the video recorder as shown in FIG. 1 is explained with reference to a flow chart.

After the start according to step 100, the current or actual tape counter reading and the tape counter reading assigned to the reference marking 3 are compared with each other and, according to step 101, at the same time it is enquired how far the respective determined tape position or the respective tape counter reading corresponding to this tape position is still away from the tape counter reading of a target position, which corresponds to the tape position or the tape counter reading value of the reference marking 3.

If the comparison or a corresponding measurement reveals here that the tape counter reading corresponding to the current tape position is greater than the tape counter reading value of the reference marking 3 plus a tape counter reading difference corresponding to a 2-minute normal playback, the already mentioned drive-control device (not shown) switches the tape-winding drive according to step 102 to rewind, rewinding continuing, as represented by step 104, until the difference between the current tape position and the target position, or until the difference between the tape counter reading corresponding to the current tape position and the tape counter reading value of the target position, is equal to/less than the tape counter reading difference corresponding to the 2-minute normal playback.

The two minutes to the target position, or the tape counter reading difference corresponding to the 2-minute normal playback, in this case form half the window width of the tolerance window 5 represented in FIG. 1.

If, however, the comparison according to step 101 reveals that the tape counter reading corresponding to the current tape position is less than the tape counter reading value of the target position plus the tape counter reading difference corresponding to the 2-minute normal playback, the drive-control device switches the tape-winding drive according to step 103 to forward wind, forward winding continuing, as represented by step 105, until the difference between the current tape position and the target position, or until the difference between the tape counter reading corresponding to the current tape position and the tape counter reading value of the target position, is equal to/greater than the tape counter reading difference corresponding to the 2-minute normal playback.

The search or detection of the reference marking 3 which follows this can consequently then only take place from one window side of the tolerance window 5 (here preferably the window side with the greater tape counter reading value, since the reference marking 3 is probably in most cases placed respectively at the beginning of a recording), and this is so irrespective of from which tape position the start according to step 100 took place. This procedure has the advantage that it is ensured in a simple way that, after a start according to step 100, in every case you go to the recording in question and consequently precludes a possible detection of markings of other recordings which are on the tape 2.

Thus, if the current tape position according to step 104 is then equal to/less than or, as in the other case according to step 105, when the start according to step 100 for winding to recording sections identified by markings 4 took place from the beginning of the tape or in front of the reference marking 3, equal to/greater than two minutes from the target position, in both cases further rewinding according to step 106 and an enquiry according to step 107 are carried out to search for the marking 3, which in a way corresponding to the invention may be a reference and/or starting marking for the further sectional markings 4, for example a VISS mark. The search for the reference marking 3 is performed by the drive-control device switching over automatically from the comparison of tape counter readings to the detection of the reference mark 3.

As soon as the reference mark 3 has been detected, the counter reading is set, as represented by step 109, to the stored tape counter reading value assigned to the reference mark 3. From this counter reading, a start is made, as represented by step 111, on marking sectional markings 4 and/or storing tape counter readings corresponding to these markings 4, or, in the case of already existing sectional markings 4 or corresponding stored tape counter readings, the corresponding playback can be begun, including the skipping of undesired recording sections.

If, however, as represented by step 107, it was not possible to detect the reference mark 3, first of all it is automatically checked by an enquiry according to step 108 whether the current tape position lies inside or outside the 4-minute tolerance window 5. If the tape position lies within this tolerance window 5 and the reference mark 3 can nevertheless not be found or detected, for example on account of tape damage, according to step 110 the operation is terminated. In such a case, a renewed search operation for the reference marking 3 can then be started. If in this case the reference marking 3 is again not detected, a new search operation according to the above process can be initiated, using for example one of the sectional markings 4 as the new reference marking.

If at step 108 the current tape position lies outside the tolerance window 5, rewinding or forward winding is continued (depending on the tape-driving direction to wind to the target position), until the tolerance window 5 is reached, or until the difference between the tape counter reading corresponding to the current tape position and the tape counter reading value of the target position is equal to/less than or equal to/greater than (if the target position is approached from the beginning of the tape) the tape counter reading difference corresponding to the 2-minute normal playback, the process then proceeding in a way corresponding to the flow chart from step 106 with the detection of the reference mark 3.

We claim:

1. Machine for recording and playing back information with a tape-storage medium comprising:

a tape-counting device for determining locations on said storage medium representing a beginning, an end or a section of a recorded information and labeling said locations as data, said determining and labeling of said locations defining a setting, means for storing the labeled data in a static memory, means for evaluation of the labeled data, means for marking and detection of locations on said tape-storage medium representing a beginning, an end or a section of a recorded information wherein at least one of marks in addition to a reference mark corresponding to the detected locations are recorded onto said tape-storage medium, and means for selectively winding to a chosen recording section associated with one of said at least one of marks by means of the tape-counting device and said stored labeled data together with one of said detectable marks which is used as the reference wherein, due to the detection of this reference mark, the tape-counting device is set to the data which was determined with the setting of said reference mark, and wherein the mark associated with said chosen recording section is dependent on said data of said reference mark.

2. Machine according to claim 1, wherein by evaluation of the respective counter reading data and remaining playing time data the position of the reference mark on the tape recording medium is determined, there being provided for finding the reference mark a tolerance window arranged symmetrically with respect to the reference mark and which corresponds to a predeterminable counter reading difference and playing time difference.

* * * * *